United States Patent
Wolfschwenger et al.

(10) Patent No.: US 7,473,463 B2
(45) Date of Patent: Jan. 6, 2009

(54) POLYPROPYLENE BLOWN FILM

(75) Inventors: Johannes Wolfschwenger, Niederneukirchen (AT); Peter Niedersuess, Ried/Riedmark (AT); Anton Wolfsberger, Gallneukirchen (AT)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 10/571,946

(22) PCT Filed: Sep. 6, 2004

(86) PCT No.: PCT/EP2004/009910

§ 371 (c)(1),
(2), (4) Date: May 8, 2006

(87) PCT Pub. No.: WO2005/026240

PCT Pub. Date: Mar. 24, 2005

(65) Prior Publication Data

US 2007/0032580 A1    Feb. 8, 2007

(30) Foreign Application Priority Data

Sep. 12, 2003    (EP)    .................................. 03020752

(51) Int. Cl.
*B32B 27/32*    (2006.01)

(52) U.S. Cl. ........................ 428/216; 428/331; 428/484; 428/349; 428/516

(58) Field of Classification Search ................. 428/216, 428/331, 484, 349, 516, 520
See application file for complete search history.

(56) References Cited

U.S. PATENT DOCUMENTS 5,326,627 A * 7/1994 Yazaki et al. ................ 428/116
5,342,868 A * 8/1994 Kimura et al. ............... 524/108
5,685,128 A    11/1997 Chum et al.

FOREIGN PATENT DOCUMENTS

| EP | 0316187 | 5/1989 |
|----|---------|--------|
| EP | 0369658 | 5/1990 |
| EP | 369658 A2 * | 5/1990 |
| JP | 02178341 | 7/1990 |
| JP | 03103456 | 4/1991 |
| WO | WO-99/24479 | 5/1999 |
| WO | WO-03/040202 | 5/2003 |

* cited by examiner

*Primary Examiner*—Robert D. Harlan
(74) *Attorney, Agent, or Firm*—Jordan and Hamburg LLP (57) ABSTRACT

The invention refers to polypropylene blown films which are characterised by excellent optical and mechanical properties. The polypropylene composition used for the films contains nucleating agents.

15 Claims, 6 Drawing Sheets

Figure 1:
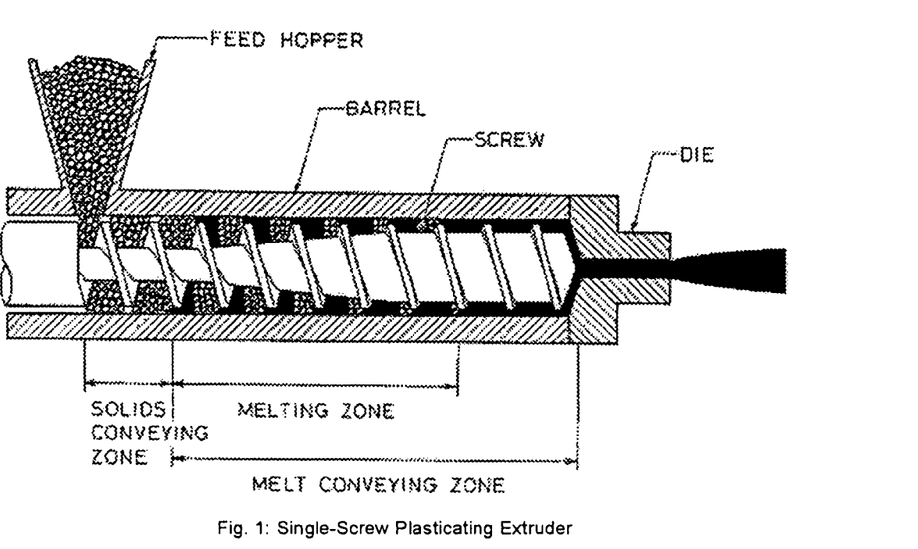

Fig. 1: Single-Screw Plasticating Extruder

Figure 2:
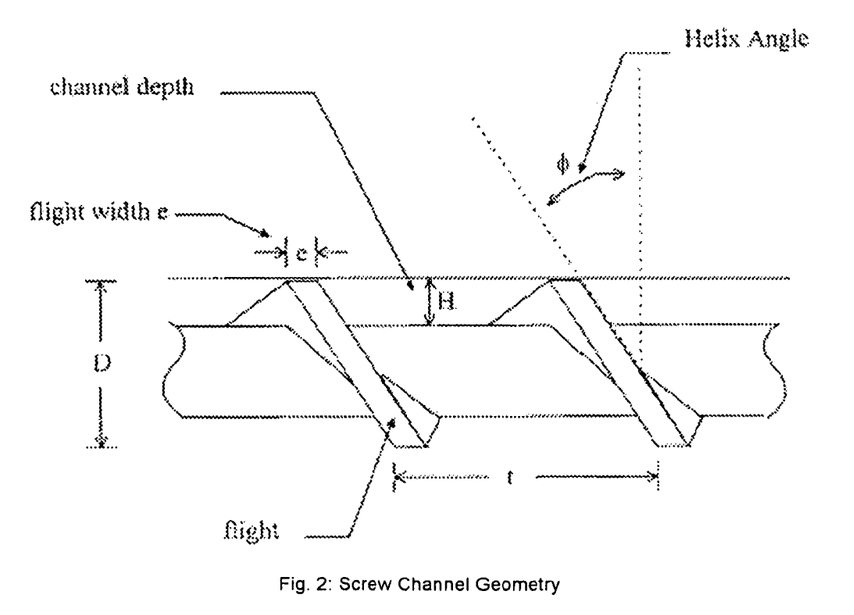

Fig. 2: Screw Channel Geometry

Figure 3:
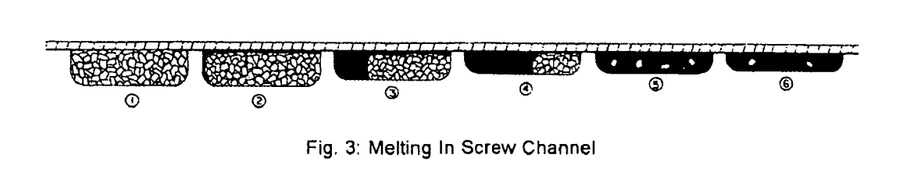

Fig. 3: Melting In Screw Channel

Figure 4:
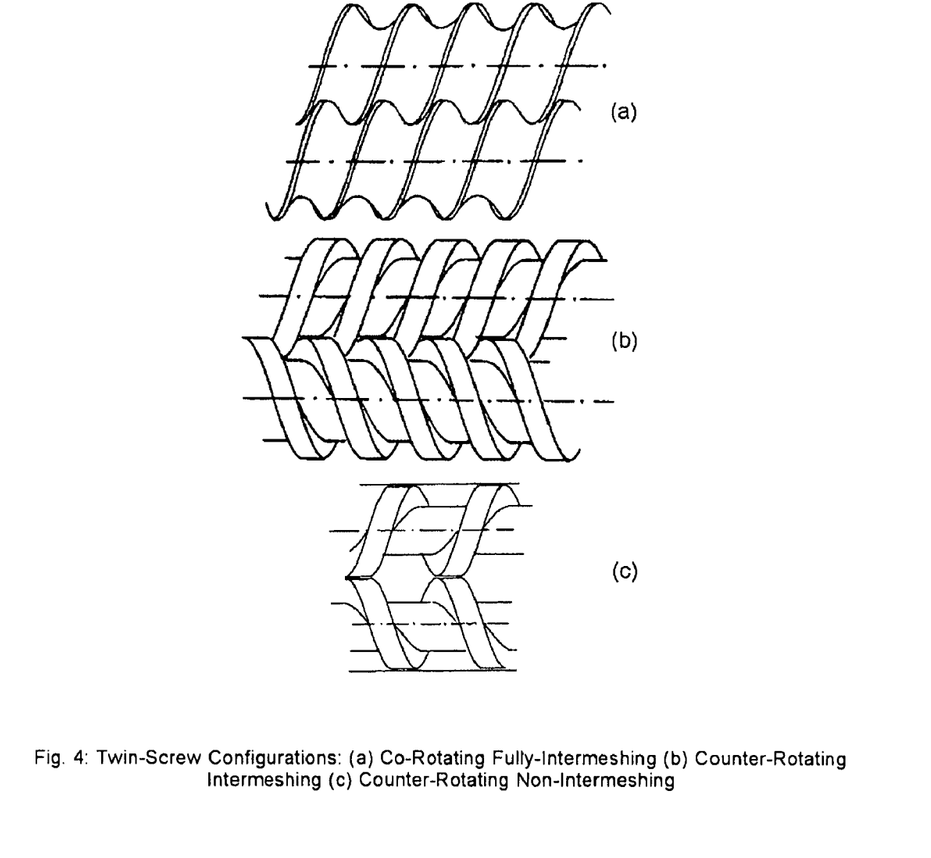
Figure 5:
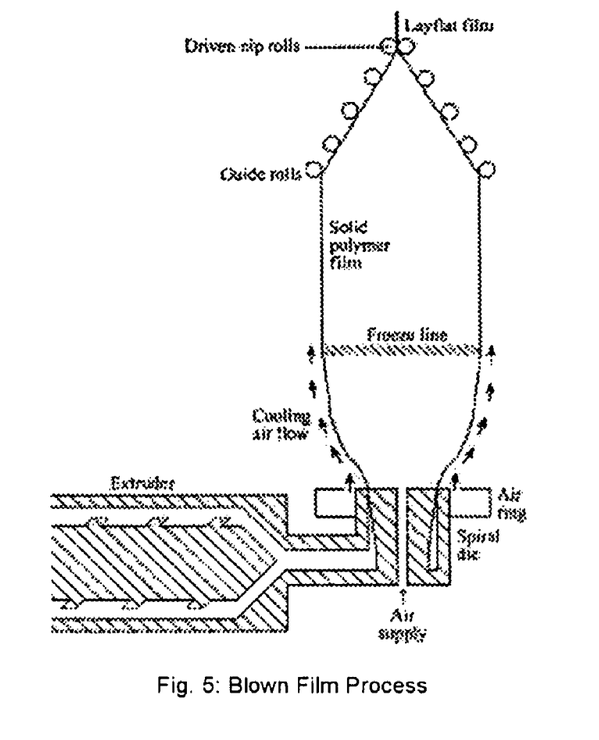
Figure 6:
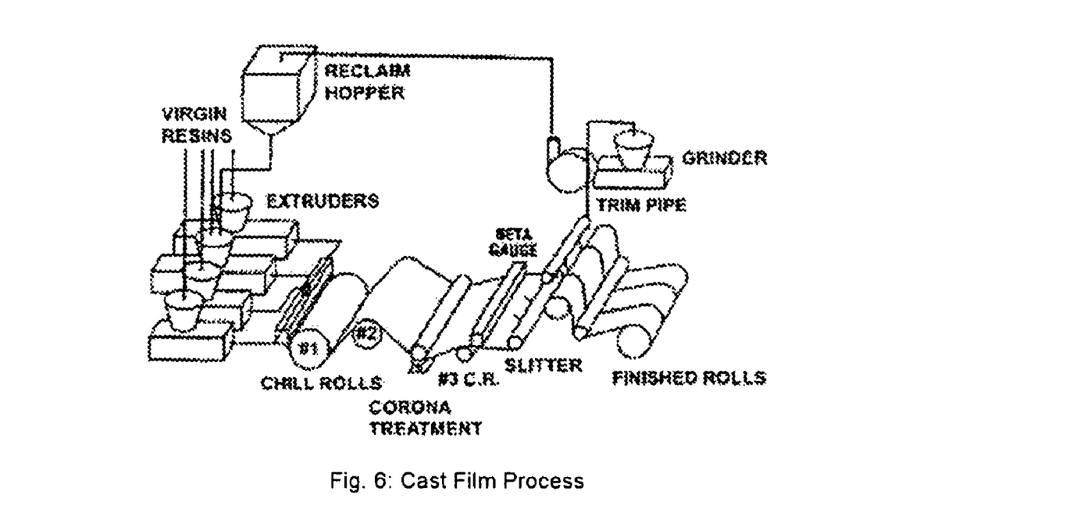
Figure 7:
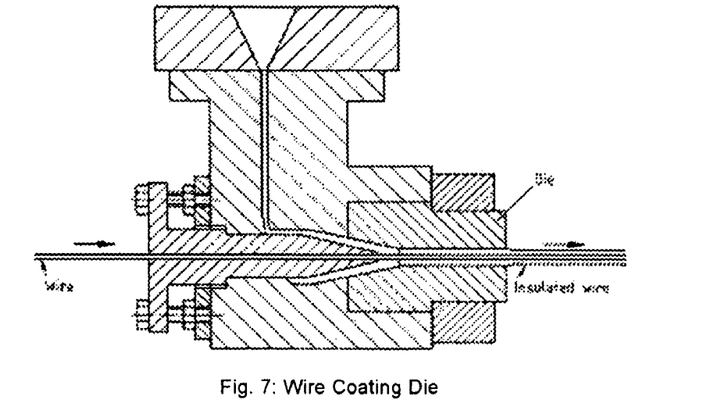
Figure 8:
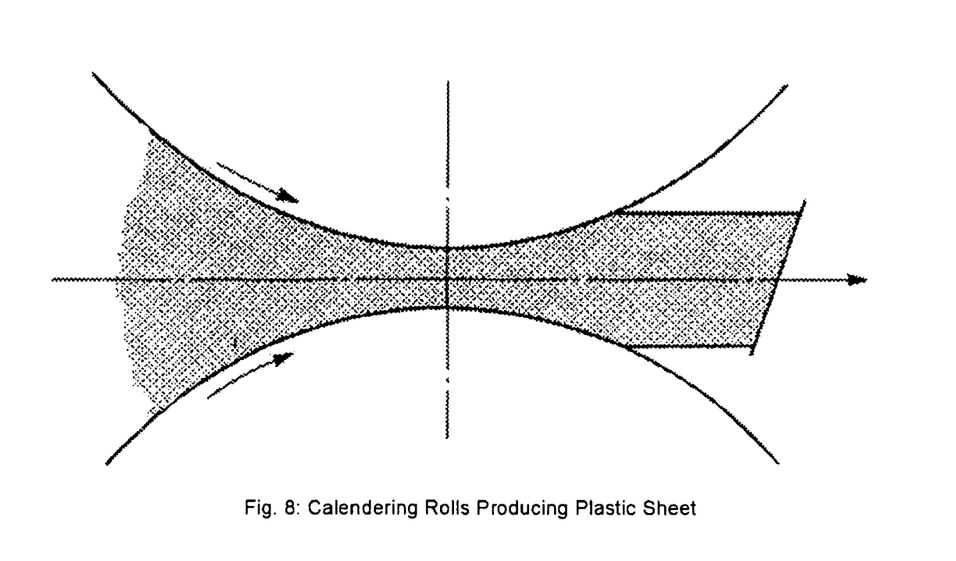
Figure 9:
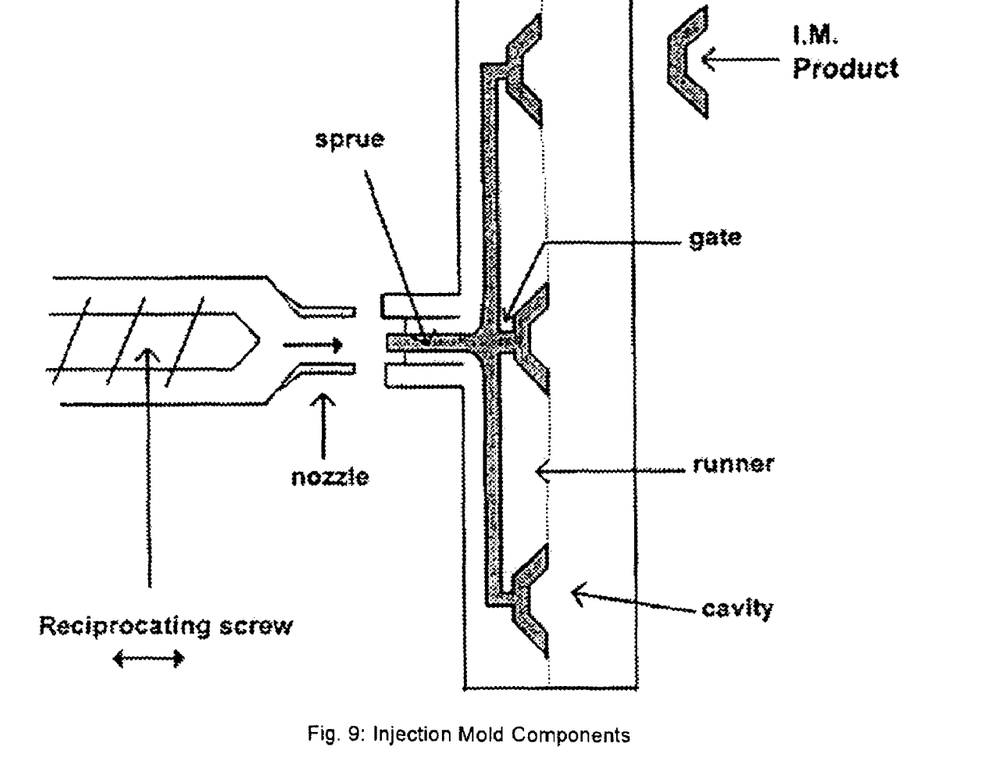
Figure 10:
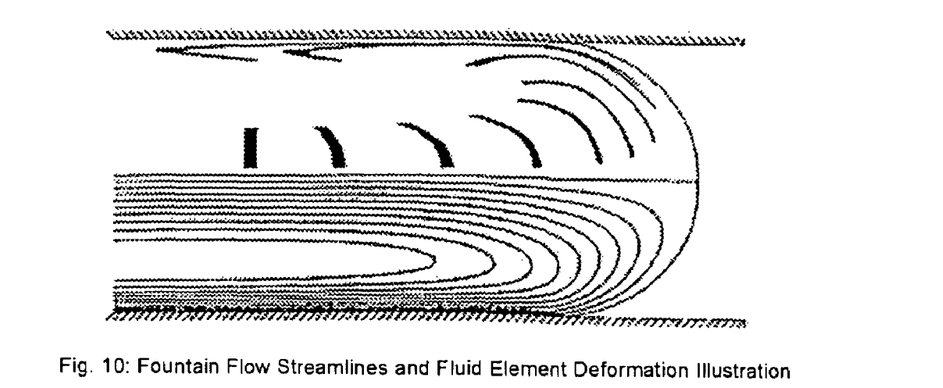
Figure 11:
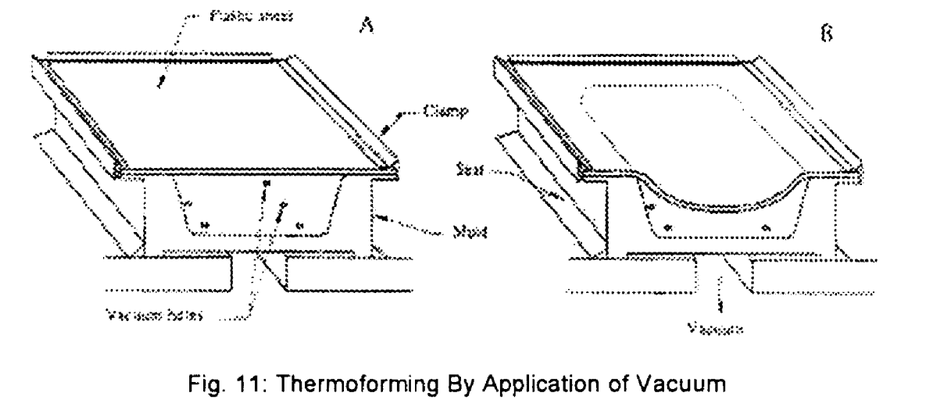

Fig. 4: Twin-Screw Configurations: (a) Co-Rotating Fully-Intermeshing (b) Counter-Rotating Intermeshing (c) Counter-Rotating Non-Intermeshing Fig. 5: Blown Film Process Fig. 6: Cast Film Process Fig. 7: Wire Coating Die Fig. 8: Calendering Rolls Producing Plastic Sheet Fig. 9: Injection Mold Components Fig. 10: Fountain Flow Streamlines and Fluid Element Deformation Illustration Fig. 11: Thermoforming By Application of Vacuum

POLYPROPYLENE BLOWN FILM

BACKGROUND OF THE INVENTION

The invention relates to a blown film comprising a polypropylene composition. In particular, the invention relates to polypropylene blown films having excellent optical properties, as well as mechanical properties.

Polypropylene for films is today almost exclusively used for cast films. In the cast film process a very quick cooling of the melt is achieved with a chill roll, in order to utilise the potentially good optical and mechanical properties of polypropylene for film applications.

Until now, polypropylene could be used in the blown film process only when it was possible to use water contact cooling in order to achieve the same quick cooling as in the cast film process.

In a conventional blown film process using air cooling, the polypropylene melt and the films produced from it are only slowly cooled. This results in insufficient optical and mechanical parameters because the slow cooling process causes an uncontrolled growth of the crystal- and spherolitic structure. Polypropylene blown films produced with air cooling are both cloudy and brittle.

It has been tried to improve the problem of cloudiness and brittleness of polypropylene blown films by using a combination of propylene random copolymer with either inorganic nucleating agent or sorbitol-based nucleating agents. Improvements of optical and mechanical parameters were only possible to a very limited extent.

It is therefore the object of the invention to provide a polypropylene blown film having good optical parameters, comparable to those obtained with a cast film, together with a well balanced stiffness/drawability ratio.

SUMMARY OF THE INVENTION

The above object is achieved by a blown film comprising a polypropylene composition containing a propylene homopolymer or propylene copolymer with ethylene and/or another α-olefin, the polypropylene composition containing a clarifier comprising one or more phosphate-based α-nucleating agents and/or polymeric α-nucleating agents selected from the group consisting of vinylcycloalkane polymers and vinylalkane polymers.

It was surprisingly possible to produce a polypropylene blown film having excellent optical parameters, good stiffness (tensile modulus) and drawability (elongation at break) on a conventional blown film plant using air cooling.

This is particularly surprising, because for most other applications including blow molding, injection molding and also cast film, the sorbitol-based nucleating agents give the best or comparable gloss and haze.

The propylene copolymer can be heterophasic or random, the latter being preferred. It contains ethylene and/or another a olefin, the a olefin can be a $C_4$-$C_{10}$, preferably a $C_4$-$C_6$ α olefin.

The ethylene content of the copolymer can be up to 10 wt % or up to 8 wt %. A preferred content is less than 5 wt %, for example from 0,3 wt % to 4,8 wt %.

Additionally the composition can contain other polymers like HDPE, LDPE, LLDPE, VLDPE, ULDPE or other polymers or copolymers containing ethylene and another α-olefin.

The α-nucleating agents which may be used for the blown films of the invention include aluminum-hydroxy-bis[2,2'-methylene-bis(4,6-di-t-butylphenyl) phosphate] and/or polymeric α-nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl(cyclo)alkane polymer. These methods are described in greater detail in e.g. EP 0 316 187 A2 and WO 99/24479.

Among all α-nucleating agents mentioned above aluminum-hydroxy-bis[2,2'-methylene-bis (4,6-di-t-butylphenyl) phosphate] is preferred.

It was found, that the intended effects, i.e. increased gloss, reduced haze and improved stiffness, are especially pronounced when this type of α-nucleating agent is used.

Smaller amounts of α-nucleating agents than 0,001 wt % usually do not give the desired level of effect, while with larger amounts than 5 wt %, although giving the desired effect, the produced blown films are becoming too expensive because of the high priced nucleating agents.

A further aspect of the invention relates to multilayer blown films, where at least one layer is comprised of a polypropylene blown film according to the invention.

When polypropylenes are used, which are nucleated with sorbitol-based nucleating agents, it is not possible to coextrude such multilayer blown films without problems, because the volatility of sorbitol-based nucleating agents is already very high in the range of the necessary processing temperatures of the further layer(s). This causes rapidly growing deposits of nucleating agent around the extrusion die. The deposits have to be periodically removed for which it is necessary to stop the entire production.

Therefore, the further aspect of the invention relates to multilayer blown films, where at least one layer is comprised of a polypropylene blown film containing a clarifier comprised of one or more phosphate based α-nucleating agents and at least one further layer is comprised of a polymer having a higher melting temperature than the polypropylene.

In addition to the benefits gained from the improved optical and mechanical properties of the polypropylene layer, such multilayer blown films can be produced by coextrusion without causing deposits around the extrusion die.

The polymers having a higher melting temperature than the polypropylene which are used for the coextrusion of multilayer blown films are preferably any one or more of polyamide, polyvinylalcohol and polyethylene terephthalate.

According to a further embodiment of the invention a multilayer blown film comprises at least two layers, wherein at least one layer comprises a polypropylene composition according to the invention and at least one further layer is comprised of an ethylene polymer.

In areas, where very low seal initiation temperature (SIT) in combination with good optics is required, it has been found, that combinations of polypropylenes with polyethylenes (e.g. $C_4$-LLDPE or LDPE) are beneficial. Compared to PE, PP has high temperature resistance while PE has low SIT. For fast sealing process on packaging lines it is necessary to have as high sealing temperature as possible. Consequently, this requires a film with a top layer (the layer, which has direct contact to the sealing bars) having a high melt temperature in order to withstand the high sealing temperatures and a sealing layer with a very low melting temperature which starts sealing at lowest possible temperature and providing good seam strength. Such film properties can be achieved by a combination of transparent PP for the top layer and PE for the sealing layer.

According to a further aspect the multilayer blown film comprises an adhesive layer intermediate to and adjacent to both the layer comprising a polypropylene composition according to the invention and the further layer comprising an ethylene polymer.

In the case of conventional PE, an adhesive layer is required between those layers in order to give sufficient bonding strength between the PP and PE layer since PP and conventional PE have different polarities and therefore not sufficient adhesion.

According to a still further embodiment the layer comprising a polypropylene composition according to the invention and the further layer comprising an ethylene polymer are adjacent to each other and the further layer is selected for having good adhesion to the layer comprising the polypropylene composition.

The presence of an adhesive layer requires that such films can be produced by using at least a 3 layer coex film. It is therefore advantageous, when an intermediate adhesive layer can be omitted and the further layer itself is selected to provide sufficient bonding strength to the PP-layer.

According to an advantageous embodiment, the ethylene polymer of the further layer is a single site catalyst polyethylene (SSC-PE).

By using a single site catalyst PE (SSC-PE) which is characterised by a low density (below 0,920 g/cm3) instead of the standard PE, a good adhesion to PP is obtained and no extra adhesive layer inbetween the PP- and PE-layer is necessary.

The polypropylene compositions which are used for the films of the invention may contain various additives, which are generally used in polypropylene compositions, such as stabilisers, antioxidants, acid neutralising agents, lubricants, ultraviolet absorbers, antiblocking agents, antistatic agents, antifogging agents, etc.

Preferred antioxidants are phenolic antioxidants, e.g. 2-t-butyl4,6-dimethylphenol, 2,6-di-t-butyl-4-methyl-phenol, 2,6-di-t-butyl-4-isoamylphenol, 2,6-di-t-butyl-4-ethylphenol, 2-t-butyl-4,6-diisopro-pylphenol, 2,6-dicyclopentyl-4-methylphenol, 2,6-di-t-butyl-4-methoxymethyrphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octade-cyl 3(3,5-di-t-butyl-4-hydroxyphenyl) propionate, 1,3,5-trimethyl-2,4,6-tris(3',5'-di-t-bu-tyl-4-hy-droxybenzyl)benzene and pentaerythrityl-tetrakis-3-(3,5-di-t-butyl-4-hydroxyphenyl)propionate.

Preferred stabilisers are phosphite based stabilisers, e.g. tris-(2,4-di-tert.butylphenyl)-phosphite.

The acid neutralising agents and/or lubricants are preferably carboxylic acid salts, where the metal is selected from the 1st or 2nd group of the periodic table or from transition metals like Zinc. Also synthetic hydrotalcite or Magnesium oxide can be used. Preferred carboxylates are Li-Stearate, Na-Stearate, K-Stearate, Li-Myristate, Na-Myristate, K-Myristate, Ca-Stearate, Mg-Stearate, Ca-12-hydroxy stearate, Mg-12-hydroxy stearate, Ca-Myristate, Ca-Palmitate, Ca-Laurate, Mg-Myristate, Mg-Palmitate, Mg-Laurate and Zn-Stearate.

DETAILED DESCRIPTION OF THE INVENTION

Description Of Measurement Methods

MFR

The melt flow rates were measured with a load of 2.16 kg at 230° C. The melt flow rate is that quantity of polymer in grams which the test apparatus standardised to ISO 1133 extrudes within 10 minutes at a temperature of 230° C. under a load of 2.16 kg.

Comonomer Contents

Comonomer contents (ethylene) were measured with Fourier transform infrared spectroscopy (FTIR) calibrated with $^{13}$C-NMR.

Gloss

Gloss was determined according to DIN 67530 on cast films (thickness 50 μm) and on blown films (thickness 40 μm) at an angle of 20°.

Haze

Haze was determined according to ASTM D 1003-92 on injection moulded test plaques (60×60 ×2 mm), on cast films (thickness 50 μm) and on blown films (thickness 40 μm).

Tensile Test

Tensile test was performed according to ISO 527-3 on cast films (thickness 50 μm) and on blown films (thickness 40 μm).

Elmendorf

Elmendorf was determined according to ISO 6383/2 (1983) on cast films (thickness 50 μm) and on blown films (thickness 40 μm).

EXAMPLES

The following polymers were used for the examples and comparative examples.

TABLE 1

| polymer | polymer type | MFR [g/10 min] | C2 [wt %] | nucleating agent type | nucleating agent concentration [wt %] | Haze (injection moulded) [%] |
| --- | --- | --- | --- | --- | --- | --- |
| polymer 1 | random copolymer | 1.5 | 4.8 | NA21 | 0.2 | 23.0 |
| polymer 2 | random copolymer | 1.5 | 4.8 | Millad 3988 | 0.2 | 21.3 |
| polymer 3 | homopolymer | 2 | — | no | — | 87.3 |
| polymer 4 | homopolymer | 8 | — | no | — | — |

Millad 3988 . . . 1,3:2,4 bis(3,4-dimethyl-benzylidene) sorbitol
NA21 . . . commercially available from Asahi Denka Kogyo (Japan) under the name "ADK STAB NA21E". NA21 contains aluminium-hydroxy-bis[2,2'-methylene-bis(4,6-di-t-butylphenyl)phosphate].
Polymers 1 to 4 are equipped with conventional stabilisation, i.e. 0.15 wt % Tris-(2,4-di-tert.butylphenyl)-phosphite, 0.1 wt % Pentaerythrityl-tetrakis-[3-(3,5-di-tert.butyl-4-hydroxyphenyl)-propionate] and processing aids, i.e. 0.05 wt % calcium stearate.

Blown films were produced on a single screw extruder with a barrel diameter of 70 mm and a round-section die of 200 mm with 1 mm die gap in combination with a monolip cooling ring and internal bubble cooling (IBC). Melt temperature was 210° C. in the die; the temperature of the cooling air was kept at 15° C. and the blow up ratio (BUR) 3:1. A film thickness of 40 μm was adjusted through the ratio between extruder output, takeoff speed and BUR.

Cast films were produced on a single screw extruder with a barrel diameter of 52 mm and a slot die of 800×0.5 mm in combination with a chill- and a takeup-roll. Melt temperature was 240° C. in the die; the chill-roll was kept at 15° C. and the takeup roll at 20 ° C. A film thickness of 50 μm was adjusted through the ratio between extruder output and takeoff speed.

The films were tested and analysed as is outlined and described above. The results are shown in table 2.

Example E1 is according to the invention, examples C1 to C3 are comparative examples.

TABLE 2

| | | | Example | | | |
|---|---|---|---|---|---|---|
| | | | E1 | C1 | C2 | C3 |
| | | | | Material | | |
| | | | polymer 1 Blownfilm | polymer 2 Blownfilm | polymer 3 Blownfilm | polymer 4 Castfilm |
| Tensile test md | tens. Mod. | MPa | 925.7 | 912.5 | 1440 | 670 |
| | yield str. | MPa | 26.8 | 25.55 | 36.38 | 18.7 |
| | yield elong. | % | 12.54 | 12.47 | 8.5 | 6.6 |
| | tens. Str. | MPa | 50.21 | 52.84 | 60 | 33.8 |
| | elong.at break | % | 581.32 | 656.75 | 681 | 715.6 |
| Tensile test td | tens. Mod. | MPa | 972.5 | 911.2 | 1380 | 693 |
| | yield str. | MPa | 24.42 | 23.97 | 35.45 | 18.8 |
| | yield elong. | % | 8.75 | 10.35 | 7.7 | 6.4 |
| | tens. Str. | MPa | 34.31 | 39.04 | 32.1 | 31.8 |
| | elong. at break | % | 665.07 | 728.21 | 9.71 | 730 |
| Elmendorf | md | N/mm | 3.36 | 3.94 | 1.8 | 7.8 |
| | td | N/mm | 9.95 | 9.64 | 12.3 | 25.5 |
| Gloss | outs. | % | 70.8 | 16.3 | 1 | 120 |
| | inns. | % | 65.3 | 30 | 1 | 115 |
| Haze | | % | 3.96 | 10.33 | 64 | 2.2 |

The film from example E1 has excellent stiffness, i.e. tensile modulus is in both directions higher than for C2. Drawability (elongation at break) is comparable to that of the comparative examples and, of course, drawability of the homopolymer blown film in transverse direction is virtually non-existent. The optical properties gloss and haze of E1 are remarkably improved compared to C1.

The invention claimed is:

1. Blown film comprising at least one layer comprised of a polypropylene composition comprising a mixture of a propylene homopolymer or propylene copolymer, ethylene and/or another α-olefin, and a clarifier comprising the α-nucleating agent aluminum-hydroxy-bis[2,2'-methylene-bis(4,6-di-t-butylphenyl)phosphate].

2. Blown film according to claim 1, wherein the proportion of the α-nucleating agent in the polypropylene composition is from 0.001 to 5 wt %.

3. Blown film according to claim 1, further comprising at least one additional layer, the additional layer being comprised of a polymer having a higher melting temperature than said polypropylene.

4. Blown film according to claim 3, wherein the polymer having a higher melting temperature than said polypropylene is selected from the group consisting of polyamide, polyvinylalcohol and polyethylene terephthalate.

5. Blown film according to claim 1, further comprising at least one additional layer, the additional layer being comprised of an ethylene polymer.

6. Blown film according to claim 5, further comprising an adhesive layer intermediate to and adjacent to both the layer comprised of a polypropylene composition and the additional layer comprised of an ethylene polymer.

7. Blown film according to claim 5, wherein the layer comprised of a polypropylene composition and the additional layer comprised of an ethylene polymer are adjacent to each other and the additional layer is selected for having good adhesion to the layer comprised of the polypropylene composition.

8. Multilayer blown film according to claim 7, wherein the ethylene polymer of the additional layer is a single site catalyst polyethylene (SSC-PE).

9. Blown film according to claim 1, further comprising at least one additional layer.

10. Blown film according to claim 9, wherein said at least one additional layer comprises at least one polymer selected from the group consisting of polyamide, polyvinylalcohol and polyethylene terephthalate.

11. Blown film according to claim 3, wherein said at least one additional layer comprises polyvinylalcohol.

12. Blown film according to claim 9, wherein said at least one additional layer comprises polyvinylalcohol.

13. Blown film comprising at least one layer consisting of a polypropylene composition consisting of:
   a propylene homopolymer or propylene copolymer;
   ethylene and/or another α-olefin;
   an α-nucleating agent consisting of aluminum-hydroxy-bis[2,2'-methylene-bis(4,6-di-t-butylphenyl)phosphate]; and at least one selected from the group consisting of stabilisers, antioxidants, ultraviolet absorbers, antiblocking agents, antistating agents, and antifogging agents.

14. Blown film comprising at least one layer consisting of a polypropylene composition consisting of:
  a propylene homopolymer or propylene copolymer;
  ethylene and/or another α-olefin; and
  an α-nucleating agent consisting of aluminum-hydroxy-bis[2,2'-methylene-bis(4,6-di-t-butylphenyl)phosphate].

15. The blown film according to claim 1, wherein said propylene copolymer is a random copolymer.

* * * * *